United States Patent [19]

Witmann et al.

[11] Patent Number: 5,552,465
[45] Date of Patent: Sep. 3, 1996

[54] POLYCARBONATE MOLDING COMPOUNDS STABLE TO LIGHT AGEING

[75] Inventors: Dieter Witmann, Köln; Jochen Schoeps, Krefeld; Bernd Urbanneck, Mönchengladbach; Karl Huff, Dormagen; Karl-Heinz Ott; Horst Peters, both of Leverkusen, all of Germany

[73] Assignee: Bayer Atkiengesellschaft, Leverkusen, Germany

[21] Appl. No.: 566,030

[22] Filed: Dec. 1, 1995

Related U.S. Application Data

[63] Continuation of Ser. No. 355,462, Dec. 14, 1994, abandoned, which is a continuation of Ser. No. 777,986, Oct. 17, 1991, abandoned.

[30] Foreign Application Priority Data

Oct. 24, 1990 [DE] Germany .................. 40 33 806.1

[51] Int. Cl.⁶ .............. C08K 5/51; C08K 5/52; C08L 51/00; C08L 69/00
[52] U.S. Cl. ............ 524/139; 524/140; 524/141; 524/504; 524/537
[58] Field of Search ................... 524/139, 140, 524/141, 504, 537

[56] References Cited

U.S. PATENT DOCUMENTS 4,937,285  6/1990  Wittmann et al. ............ 525/67
4,983,658  1/1991  Kress et al. .................. 524/141

FOREIGN PATENT DOCUMENTS 3819081  12/1989  Germany .

Primary Examiner—Joseph L. Schofer
Assistant Examiner—Wu C. Cheng
Attorney, Agent, or Firm—Joseph C. Gil; Aron Preis

[57] ABSTRACT

Polycarbonate molding compositions resistant to light aging and exhibiting an improved notched impact strength are disclosed. The compositions which are based on an aromatic polycarbonate, aromatic polyester carbonate or a polyester, contain a redox-catalyzed graft polymer of resin-forming monomers on a rubber, a phosphorus compound and a fluorinated polyolefin.

5 Claims, No Drawings

POLYCARBONATE MOLDING COMPOUNDS STABLE TO LIGHT AGEING

This application is a continuation of application Ser. No. 08/355,462 filed Dec. 14, 1994 abandoned which is a continuation of application Ser. No. 07/777,986 filed Oct. 17, 1991, now abandoned.

This invention relates to thermoplastic molding compounds containing

A) 30 to 97% by weight, preferably 40 to 96% by weight and, more preferably, 50 to 95% by weight, based on A+B+C, thermoplastic aromatic polycarbonate, aromatic polyester carbonate, aromatic polyester or mixtures thereof, B) 3 to 30% by weight, preferably 4 to 20% by weight and, more preferably, 5 to 15% by weight, based on A+B+C, of a graft polymer of B.1 40 to 90% by weight of an at least partly crosslinked particulate diene rubber having an average particle diameter ($d_{50}$) of from 0.05 µm to 2.0 µm and preferably from 0.1 to 0.6 µm and B.2 60 to 10% by weight, styrene, acrylonitrile, methyl methacrylate or mixture thereof, said B being prepared by emulsion graft polymerization using an initiator of an organic hydroperoxide and ascorbic acid to obtain a graft yield of >60% by weight and preferably >75% by weight of the monomers B.2, C) 0 to 40% by weight, preferably 1 to 30% by weight and, more preferably, 5 to 25% by weight, based on A+B+C, of a thermoplastic resin which is C.1 a thermolastic copolymer of C.1.1 50 to 95% by weight, styrene, α-methyl styrene, mucleus-substituted styrene, methyl methacrylate or mixtures thereof and C.1.2 50 to 5% by weight acrylonitrile, methacrylonitrile, methylmethacrylate, maleic anhydride, N-substituted maleic imide or mixtures thereof or C.2 a polyalkylene terephthalate, D) 1 to 20 parts by weight, preferably 2 to 15 parts by weight and, more preferably, 3 to 12 parts by weight, based on 100 parts by weight A+B+C, of a phosphorus compound corresponding to formula (I)

$$R^1-(O)_n-\underset{\underset{R^3}{\overset{\overset{O}{\|}}{\underset{|}{(O)_m}}}}{P}-(O)_n-R^2 \quad (I)$$

in which $R^1$, $R^2$ and $R^3$ independently of one another represent $C_{1-8}$ alkyl or $C_{6-20}$ aryl, optionally the alkyl and aryl groups may be halogenated, and the aryl group may additionally be alkyl substituted, m is 0 or 1 and n is 0 or 1, E) 0.05 to 5 parts by weight, preferably 0.1 to 1 part by weight and, more preferably, 0.1 to 0.5 part by weight, based on 100 parts by weight A+B+C, of a fluorinated polyolefin having average particle diameters of 0.05 to 1000 µm, a density of 1.2 to 2.3 g/cm³ and a fluorine content of 59 to 76% by weight.

E) is preferably used in the form of a coagulated mixture of an emulsion of the fluorinated polyolefin having an average particle diameter of 0.05 to 20µ and a density of 1.2 to 1.9 g/cm³ with an emulsion of the graft polymer. The ratio by weight of the graft polymer B) to the fluorinated polyolefin E) is 95:5 to 60:40 and the additional quantity of B, which is necessary to prepare the coagulated mixture of E and B, is from 0.1 to 4.0 parts by weight per 100 parts by weight A+B+C. The molding compounds may contain effective quantities of known stabilizers, pigments, flow aids, fillers and reinforcing materials, mold release agents and antistatic agents.

According to European patent 0 174 493, the flame resistance of molding compounds of polycarbonates, ABS graft polymers and thermoplastic copolymers is improved with a combination of halogen compound, phosphorus compound and polytetrafluoroethylene. Although the molding compounds according to EP 0 174 493 show excellent surface quality, unwanted discoloration occurs after prolonged exposure to sunlight.

Flame-resistant molding compounds based on halogen-free polycarbonates, graft polymers, phosphorus compounds, tetrafluoroethylene polymers and, optionally, other halogen-free copolymers are the subject of DE-OS 38 19 081.

DE-OS 37 38 143 describes the use of special ABS graft polymers prepared with a redox activator system of ascorbic acid and organic hydroperoxide as additives for improving the resistance to gasoline of polycarbonate molding compounds which may additionally be treated with typical flameproofing agents.

It has now been found that the flame-resistant molding compounds according to EP 0 174 493 and DE-OS 38 19 081, which contain the ABS graft polymers according to DE-OS 37 38 143 produced with redox initiators, show improved light ageing and improved notched impact strength.

The polycarbonates and polyester carbonates A) are known and can be obtained by known methods (cf. Schnell, "Chemistry and Physics of Polycarbonates", Interscience Publishers, 1964; DE-AS 1 495 626, DE-OS 2 232 877, DE-OS 2 703 376, DE-OS 3 000 610, DE-OS 2 714 544, DE-OS 2 940 024 and DE-OS 3 007 934). A particularly preferred production process is interfacial polycondensation.

The polycarbonates, polyester carbonates and polyesters may be produced in known manner, for example by interfacial polycondensation of diphenols with carbonic acid halides, preferably phosgene and/or aromatic dicarboxylic acid dihalides, preferably benzene dicarboxylic acid dihalides, optionally using chain terminators, for example monophenols, and/or trifunctional or more than trifunctional branching agents, for example triphenols or tetraphenols. (For the production of aromatic polycarbonates, see Schnell, loc cit, pages 31 et seg; for the production of aromatic polyesters, see DE-OS 2 940 024; for the production of aromatic polyester carbonates, see DE-OS 3 007 934.)

The polycarbonates, polyester carbonates and polyesters are preferably based on diphenols corresponding to formula (II)

in which

A is a chemical bond, $C_{1-5}$ alkylene, $C_{2-5}$ alkylidene, $C_{5-6}$ cycloalkylidene, —O—, —SO—,

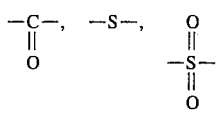

or a group corresponding to formula (III)

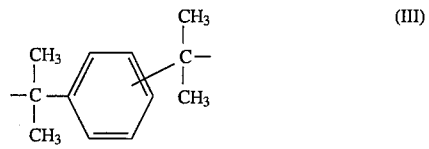

B is chlorine or bromine,
x is 0, 1 or 2 and
n is 1 or 0.

The most important of these diphenols are bisphenol A, 2,4-bis-(4-hydroxyphenyl)-2-methyl butane, 1,1-bis-(4-hydroxyphenyl)-cyclohexane, 4,4-dihydroxyphenyl sulfide, 4,4-dihydroxyphenyl sulfone and di- and tetrabrominated or chlorinated derivates, such as 2,2-bis-(3-chloro-4-hydroxyphenyl)-propane, 2,2-bis-(3,5-dichloro-4-hydroxyphenyl)-propane or 2,2-bis-(3,5-dibromo-4-hydroxyphenyl)-propane.

2,2-(Bis-4-hydroxyphenyl)-propane (bisphenol A) is particularly preferred.

Suitable thermoplastic aromatic polycarbonates A) have average molecular weights $\overline{M}w$ (weight average, as measured by ultracentrifugation or scattered light measurement) in the range from 10,000 to 200,000 and preferably in the range from 20,000 to 80,000. They may be branched by the incorporation of 0.05 to 2.0 mol-%, based on diphenols, of trifunctional or more than trifunctional compounds, for example triphenols or polyphenols.

Preferred polycarbonates are bisphenol A homopolycarbonates and copolycarbonates of bisphenol A with up to 15 mol-% 2,2-bis-(3,5-dibromo-4-hydroxyphenyl)-propane.

Aromatic dicarboxylic acid dihalides for the production of the thermoplastic aromatic polyesters and thermoplastic aromatic polyester carbonates are, preferably, the dichlorides of isophthalic acid, terephthalic acid, diphenylether-4,4'-dicarboxylic acid and naphthalene-2,6-dicarboxylic acid.

Mixtures of the dichlorides of isophthalic acid and terephthalic acid in a ratio of 1:20 to 20:1 are particularly preferred.

Carboxylic acid dichlorides alone are used for the production of the aromatic polyesters, a carbonic acid halide, preferably phosgene, being additionally used for the production of polyester carbonates.

In addition to monophenols, chain terminators which may be used in the production of the aromatic polyesters and polyester carbonates are chlorocarbonic acid esters of monophenols and also acid chlorides of aromatic monocarboxylic acids (optionally substituted by $C_{2-22}$ alkyl groups or halogen) and aliphatic $C_{2-22}$ monocarboxylic acid chlorides.

The quantity in which the chain terminator is used is up to 10 mol-% (preferably 0.1–10 mol-%), in case of phenolic chain terminator based on diphenols, and in case of monocarboxylic acid chlorides based on dicarboxylic acid dichlorides.

The aromatic polyesters and polyester carbonates may also contain incorporated aromatic hydroxycarboxylic acids.

The aromatic polyesters and aromatic polyester carbonates may be both linear and also branched in known manner (see also DE-OS 2 940 024 and DE-OS 3 007 934).

The percentage content of carbonate structural units in the thermoplastic aromatic polyester carbonates A) may basically assume any value, but is preferably up to 100 mol-%, more preferably up to 80 mol-% and, most preferably, up to 50 mol-%, based on the sum of ester groups and carbonate groups.

Both the ester component and the carbonate component of the aromatic polyester carbonates may be present in the polycondensate in the form of blocks or in statistical distribution.

The relative solution viscosity ($\eta_{rel}$) of the aromatic polyesters and aromatic polyester carbonates is preferably from 1.18 to 1.4 and more preferably from 1.22 to 1.3 (as measured on solutions of 0.5 g polyester carbonate in 100 ml $CH_2Cl_2$ solution at 25° C.).

The thermoplastic aromatic polycarbonates and the polyester carbonates may be used individually or in admixture.

The production of the graft polymers B) is described, for example, in DE-OS 3 708 913 while their use in polycarbonate and/or polyester carbonate molding compounds for improving resistance to gasoline is described in DE-OS 3 738 143.

According to DE-OS 3 708 913, the graft polymers B) are obtained by polymerization of resin-forming monomers in the presence of a diene rubber, graft yields of greater than 60% by weight and preferably greater than 75% by weight being obtained. (The graft yield is the ratio by weight of the graft-polymerized monomers to the total monomers×100 and is expressed in %). The high graft yields are attributable inter alia to the use of the redox catalyst, which is a mixture of ascorbic acid (I) and a hydroperoxide (II). The weight ratio of (I):(II) is 15 to 0,3, preferably from 10 to 1, in particular from 8 to 3 (see U.S. Pat. No. 4,937,285).

Suitable hydroperoxides are, for example, cumene hydroperoxide, tert.-butyl hydroperoxide, hydrogen peroxide, preferably cumene hydroperoxide or tert.-butyl hydroperoxide, i.e. hydroperoxides having long half lives.

By virtue of their content of graft polymers according to DE-OS 3 708 913, the molding compounds according to the invention have improved light stability and improved toughness.

Thermoplastic copolymers C.1 suitable for use in accordance with the invention are copolymers of C.1.1 styrene, α-methyl styrene, nucleus-substituted styrene (halostyrene, p-methylstyrene) with C.1.2 acrylonitrile, methacrylonitrile, methyl methacrylate, maleic anhydride, N-alkyl- or aryl-substituted maleic imide.

Thermoplastic copolymers corresponding in composition to C.1 may be formed as secondary products in the production of B). The quantity of copolymer C.1 used in accordance with the invention does not include this secondary graft polymerization product.

The copolymers C.1 are resin-like thermoplastic and rubber-free. Particularly preferred copolymers C.1 are of styrene and/or α-methyl styrene with acryolnitrile and, optionally, with methyl methacrylate.

In a particularly preferred embodiment, C.1 contains 60 to 80% by weight C.1.1 and 40 to 20% by weight C.1.2.

The copolymers C.1 are known and may be prepared by radical polymerization, more particularly by emulsion, suspension, solution or bulk polymerization. They preferably have molecular weights $\overline{M}_w$ (weight average, as determined by light scattering or sedimentation) in the range from 15,000 to 200,000 and intrinsic viscosities in the range from 20 to 110 ml/g (as measured in dimethyl formamide at 25° C.).

Polyalkylene terephthalates C.2 in the context of the invention are reacting products of aromatic dicarboxylic acids or reactive derivatives thereof (for example dimethyl esters or anhydrides) and aliphatic, cycloaliphatic or araliphatic diols and mixtures of these reaction products. They may be prepared by known methods (Kunststoff-Handbuch, Vol. VIII, pages 695 et seq, Carl-Hanser-Verlag, München, 1973).

Preferred polyalkylene terephthalates C.2 contain at least 80 mol-% and preferably at least 90 mol-% of the dicarboxylic acid residues, terephthalic acid residues, and at least 80 mol-% and preferably at least 90 mol-% of the diol residues, ethylene glycol and/or butane-1,4-diol residues.

In addition to terephthalic acid residues, the polyalkylene terephthalates C.2 may contain up to 20 mol-% residues of other aromatic or cycloaliphatic dicarboxylic acids containing 8 to 14 carbon atoms or aliphatic dicarboxylic acids containing 4 to 12 carbon atoms, for example residues of phthalic acid, isophthalic acid, naphthalene-2,6-dicarboxylic acid, 4,4'-diphenyldicarboxylic acid, succinic acid, adipic acid, sebacic acid, azelaic acid, cyclohexane diacetic acid.

In addition to ethylene glycol or butane-1,4-diol residues, they may contain up to 20 mol-% and preferably up to 10 mol-% of other aliphatic diols containing 3 to 12 carbon atoms or cycloaliphatic diols containing 6 to 21 carbon atoms, for example residues of propane-1,3-diol, 2-ethylpropane-1,3-diol, neopentyl glycol, pentane-1,5-diol, hexane-1,6-diol, cyclohexane-1,4-dimethanol, 3-ethylpentane-2,4-diol, 2-methylpentane-2,4-diol, 2,2,4-trimethylpentane-1,3- and -1,6-diol, 2-ethylhexane-1,3-diol, 2,2-diethylpropane-1,3-diol, hexane-2,5-diol, 1,4-di-(β-hydroxyethoxy)-benzene, 2,2-bis-(4-hydroxycyclohexyl)-propane, 2,4dihydroxy-1,1,3,3,-tetramethyl cyclobutane, 2,2-(bis-3-β-hydroxyethoxyphenyl)-propane and 2,2-bis-(4-hydroxypropoxyphenyl)-propane (DE-OS 2 407 647, 2 407 776, 2 715 932).

The polyalkylene terephthalates C.2 may be branched by incorporation of relatively small quantities of trihydric or tetrahydric alcohols or bribasic or tetrabasic carboxylic acids of the type described, for example, in DE-OS 1 900 270 and in U.S. Pat. No. 3,692,744. Example of preferred branching agents are trimesic acid, trimellitic acid, trimethylol ethane and propane and pentaerythritol.

Polyalkylene terephthalates C.2, which have been produced solely from terephthalic acid or reactive derivatives thereof (for example dialkyl esters) and ethylene glycol and/or butane-1,4-diol, and mixtures of these polyalkylene terephthalates are particularly preferred.

The polyalkylene terephthalates preferably used as component C.2 generally have an intrinsic viscosity of from 0.4 to 1.5 dl/g, preferably from 0.5 to 1.3 dl/g and more preferably from 0.6 to 1.2 dl/g, as measured in phenol/o-dichlorobenzene (1:1% by weight) at 25° C. and at a concentration of 0.5 g/dl.

The phosphorus compounds D) suitable for the purposes of the invention, which correspond to formula (I)

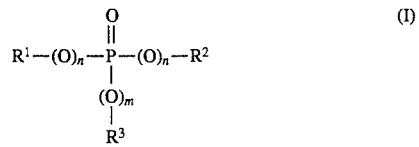

in which $R^1$, $R^2$ and $R^3$ independently of one another represent optionally halogenated $C_{1-8}$ alkyl or optionally halogenated and/or alkylated $C_{6-20}$ aryl, m is 0 or 1 and n is 0 or 1, are known (see for example Ullmann, Enzyklopädie der technischen Chemie, Vol. 18, pages 301 et seq, 1979; Houben-Weyl, Methoden der organischen Chemie, Vol. 12/1 page 43; Beilstein, Vol. 6, page 177).

Preferred substituents $R^1$ to $R^3$ are methyl, butyl, octyl, chloroethyl, 2-chloropropyl, 2,3-dibromopropyl, phenyl, cresyl, cumyl, naphthyl, chlorophenyl, bromophenyl, pentachlorophenyl and pentabromophenyl.

Preferred phosphorus compounds D) are tributyl phosphate, tris-(2-chloroethyl)-phosphate, tris-(2,3-dibromopropyl)-phosphate, triphenylphosphate, tricresylphosphate, diphenylcresylphosphate, diphenyloctylphosphate, diphenyl-2-ethylcresylphosphate, tri-(isopropylphenyl)-phosphate, halogen-substituted aryl phosphates, methyl phosphonic acid dimethyl ester, methyl phosphonic acid diphenyl ester, phenyl phosphonic acid diethyl ester, triphenyl phosphine oxide and tricresyl phosphine oxide.

The fluorinated polyolefins E) are of high molecular weight and have glass transition temperatures above −30° C., generally above 100° C., fluorine contents of 59 to 76% by weight, preferably 65 to 76% by weight and more preferably 70 to 76% by weight and average particle diameters $d_{50}$ in the range from 0.05 to 1000 μm and preferably in the range from 0.05 to 20 μm. Preferred fluorinated polyolefins E) are polytetrafluoroethylene, polyvinyliden fluoride, tetrafluoroethylene/hexafluoropropylene and ethylene/tetrafluoroethylene copolymers. The fluorinated polyolefins are known (cf. "Vinyl and Related Polymers" by Schildknecht, John Wiley & Sons, Inc., N.Y., 1962, pages 484 to 494; "Fluoropolymers" by Wall, Wiley-Interscience, John Wiley & Sons, Inc., N.Y., Vol. 13, 1970, pages 623 to 654; "Modern Plastics Encyclopedia", 1970 to 1971, Vol. 47, No. 10 A, October 1970, Mc Graw-Hill, Inc., N.Y., pages 134 and 774; "Modern Plastics Encyclopedia", 1975 to 1976, October 1975, Vol. 52, No. 10 A, Mc Graw-Hill, Inc., N.Y., pages 27, 28 and 472, and U.S. Pat. Nos. 3,671,487; 3,723,373 and 3,838,092).

They may be prepared in known manner by polymerization of tetrafluoroethylene in aqueous medium in the presence of a catalyst forming free radicals, for example sodium, potassium or ammonium peroxydisulfate, under pressures of 7 to 71 kg/cm² and at temperatures in the range from 0° to 200° C. and preferably at temperatures in the range from 20° to 100° C. (cf. U.S. Pat. No. 2,393,967). Depending on the form in which they are used, they may have a density of 1.2 to 2.3 g/cm³ for an average particle diameter of 0.05 to 1000 μm.

Preferred fluorinated polyolefins E) are tetrafluoroethylene polymers having average particle diameters of 0.05 to 20 μm and preferably 0.08 to 10 μm and a density of 1.2 to 1.9 g/cm³ in the form of a coagulated mixture of emulsions of the tetrafluoroethylene polymers E) with emulsions of the graft polymers B).

Tetrafluoroethylene polymers having average particle diameters of 100 to 1000 μm and densities of 2.0 g/cm³ to 2.3 g/cm³ in powder form are also suitable.

The addition of fluorinated polyolefins reduces or completely prevents the dripping of the molten molding compound during burning. Their use in the form of a coagulated mixture additionally improves the surface of moldings of the mixtures according to the invention, which is particularly important for the production of parts of large surface area and at very high processing temperatures.

To prepare a coagulated mixture of B) and E), an aqueous emulsion (latex) of a graft polymer B) having average latex particle diameters of 0.05 to 2 μm and more particularly from 0.1 to 0.6 μm is initially mixed with a finely divided emulsion of a tetrafluoroethylene polymer E) in water having average particle diameters of 0.05 to 20 μm and more particularly from 0.08 to 10 μm. Suitable tetrafluoroethylene polymer emulsions typically have solids contents of 30 to 70% by weight and, more particularly, 50 to 60% by weight. The emulsions of the graft polymers B) have solids contents of 25 to 50% by weight and preferably 30 to 45% by weight. The ratio by weight of graft polymer B) to tetrafluoroethylene polymer E) in the emulsion mixture is from 95:5 to 60:40.

The additional amount of graft polymer B) which is necessary to prepare the coagulated mixture of B)+E) is from 0.1 to 4.;0 parts by weight per 100 parts by weight A+B+C.

The emulsion mixture is coagulated in known manner, for example by spray drying, freeze drying or coagulation with inorganic or organic salts, acids, bases or organic water-miscible solvents, such as alcohols, ketones, preferably at temperatures in the range from 20° to 150° C. and more preferably at temperatures in the range from 50° to 100° C. If necessary, the coagulate may be dried at 50° to 200° C. and preferably at 70° to 100° C.

Suitable tetrafluoroethylene polymer emulsions are commercially available (for example Teflon® 30 N, Du Pont).

The thermoplastic molding compounds according to the invention may contain other known additives for polycarbonates, graft polymers or for thermoplastic polymers, such as stabilizers, pigments, flow aids, mold release agents, fillers and reinforcing materials and antistatic agents.

The filled or reinforced molding compounds may contain up to 60% by weight and preferably from 5 to 50% by weight, based on the molding compound, of fillers and/or reinforcing materials. Suitable reinforcing materials are, for example, glass fibers, carbon fibers, aramide fibers. Preferred reinforcing materials are glass fibers. Preferred fillers, which may also have a reinforcing effect, are glass beads, mica, silicates, quartz, talcum, titanium dioxide, wollastonite.

The molding compounds according to the invention may be prepared by mixing the constituents in known manner and melt-compounding the resulting mixture at temperatures of 200° to 330° C. in standard machines, such as internal kneaders or single-screw or twin-screw extruders, or by mixing solutions or dispersions of the constituents in suitable organic solvents, for example in chlorobenzene, and concentrating the mixed solutions or dispersions by evaporation in standard evaporation units, for example in evaporation extruders. E) is preferably used in the form of a coagulated mixture with B).

The constituents may be mixed successively or simultaneously in known manner, preferably at around 20° C. (room temperature) or at up to 50° C.

The molding compounds according to the invention may be used for the production of moldings of any kind. More particularly, moldings may be produced by injection molding. Examples of such moldings are housing parts of any kind, for example for domestic appliances, such as juice presses, coffee machines, mixers, for office machines or for cover panels for buildings and parts for motor vehicles. In addition, they may be used in the electrical field by virtue of their very favorable electrical properties.

Another form of processing is the production of moldings by thermoforming from prefabricated sheets or films.

The average particle diameters $d_{50}$ were determined by ultracentrifuge measurements in accordance with W. Scholtan et al., Colloids u. Z. Polymere 250 (1972), pages 782 to 796.

EXAMPLES

1. Constituents of the molding compounds

A. Polycarbonates

A.1 Linear bisphenol A polycarbonate having a relative solution viscosity $\eta_{rel}$ of 1.26 to 1.28, as measured in $CH_2Cl_2$ at 25° C. and at a concentration of 0.5 g/100 ml.

A.2 Copolycarbonate based on 90% by weight bisphenol A and 10% by weight tetrabromobisphenol A having a relative solution viscosity of 1.284, as measured in $CH_2Cl_2$ at 25° C. and at a concentration of 0.5 g/100 ml; bromine content: approx. 5% by weight, based on A.2.

B. Graft polymers a) Graft base (latex)

Emulsion of a partly crosslinked, coarse-particle polybutadiene having an average particle diameter of 0.38 μm ($d_{50}$ value), a gel content of 89% by weight. The emulsion contains 50% by weight polymer solids.

b) Preparation of the graft polymers

B.I Polymer of 50% by weight diene rubber (a) and 50% by weight styrene/acrylonitrile according to DE-OS 3 708 913.

A mixture of 200 parts by weight of latex (a) and 149 parts by weight water are introduced into a reactor and heated to 60° to 62° C. The following mixtures are then introduced into the reactor in the order indicated at the temperature of 60° to 62° C.:

1. Mixture of 0.0836 part by weight cumene hydroperoxide 6.9600 parts by weight water 0.0600 parts by weight Na salt of $C_{14-16}$ alkyl sulfonic acids 2. Mixture of 0.0557 part by weight ascorbic acid 6.9600 parts by weight water The following feed streams are then simultaneously introduced into the reactor with stirring over a period of 4 hours at an internal temperature of 60° C. to 62° C.:

F1) Feed 1

39.05 parts by weight water 4.00 parts by weight Na salt of disproportionated abietic acid 3.10 parts by weight 1 N sodium hydroxide 0.62 part by weight cumene hydroperoxide F2) Feed 2

72.00 parts by weight styrene 28.00 parts by weight acrylonitrile

F3) Feed 3

39.80 parts by weight water 0.105 part by weight ascorbic acid

The mixture as a whole is then polymerized for 6 hours at 60° C. to 62° C. The monomer conversion is greater than 97% by weight.

After stabilization with 1.2 parts by weight phenolic antioxidant per 100 parts by weight graft polymer, the graft polymer is isolated by coagulation with a acetic acid/magnesium sulfate mixture, washed and dried to form a powder.

The graft yield of styrene and acrylonitrile is 89% by weight.

The graft yield was determined by fractional separation with the separating liquids dimethyl formamide/methylcyclohexane in an ultracentrifuge and by determination of the quantities and the chemical composition of the fractions thus obtained [see R. Kuhn, Makromol.-Chemie 177, 1525 (1976)].

B.II Graft polymer of 50% by weight diene rubber (a) and 50% by weight styrene/acrylonitrile copolymer (Comparison)

1500 Parts by weight latex A) and 1030 parts by weight water are introduced into a reactor. After heating to 65° C., an initiator solution of 3 parts by weight potassium peroxydisulfate in 50 parts by weight water is introduced. The following solutions are then simultaneously introduced into the reactor over a period of 6 hours at 65° C.:

1. Solution 1

540 parts by weight styrene 210 parts by weight acrylonitrile

2. Solution 2

1000 parts by weight water 13 parts by weight Na salt of disproportionated abietic acid 10 parts by weight 1 N sodium hydroxide The mixture is then polymerized with stirring for another 4 hours at 65° C. The monomer conversion is greater than 98% by weight. The graft polymer is stabilized and isolated as in B.I. The graft yield of styrene and acrylonitrile is 55% by weight (determined as i B.I.).

C) Thermoplastic copolymer

Styrene/acrylonitrile copolymer, ratio by weight of styrene to acrylonitrile 72:28, having an intrinsic viscosity [η] of 0.55 dl/g (as measured in dimethyl formamide at 20° C.).

D) Triphenyl phosphate

E) Tetrafluorethylene polymer in the form of a coagulated mixture of a styrene/acrylonitrile graft polymer emulsion B) in water and a tetrafluoroethylene polymer emulsion (Teflon® 30 N, Du Pont) in water. The ratio by weight of graft polymer B) to tetrafluoroethylene polymer E) in the mixture is 90:10. The tetrafluoroethylene polymer emulsion has a solids content of 60% by weight; the average particle diameter is 0.05 to 0.5 μm. The styrene/acrylonitrile graft polymer emulsion has a solids content of 34% by weight and an average latex particle diameter of 0.38 μm.

Preparation of E.I.

The emulsion of the tetrafluoroethylene polymer was mixed with the emulsion of the styrene/acrylonitrile graft polymer B.I and the resulting mixture was stabilized with 1.8% by weight, based on polymer solids, of phenolic antioxidants. At 85° to 95° C., the mixture was coagulated with an aqueous solution of $MgSo_4$ (Epsom salt) and acetic acid at pH 4 to 5, filtered and washed until substantially free from electrolyte, subsequently freed from most of the water by centrifugation and then dried at 100° C. to form a powder. The powder obtained may then be compounded with the other components in the described units.

Preparation of E.II

Same as for E.I, except that B.II is used instead of B.I.

2. Production and testing of the molding compounds according to the invention

Components A), B), C), D) and E) were compounded in a Werner und Pfleiderer ZSK 53 twin-screw extruder at a temperature of 240° C.

Moldings were produced by injection molding at 240° C.

The burning behavior of the test specimens was measured by the UL subject 94 test in test specimen thicknesses of 1.6 mm. The UL 94 test is carried out as follows:

Samples of the material are molded to bars measuring 127×12.7×1.6 mm. The bars are vertically arranged so that the underneath of the test specimen is situated 305 mm above a strip of bandaging material. Each test bar is then individually ignited by two successive ignitions of 10 seconds duration, the burning properties are observed after each ignition and the sample is evaluated accordingly. The test specimens are ignited by a Bunsen burner with a 19 mm (¾ inch) tall blue flame of natural gas with a heat content of $3.73 \times 10^4$ kJ/m³ (1000 BUT per cubic foot).

The UL 94 classification V-O means that no test specimen burns for longer than 10 s after each exposure to the test flame; no test specimen shows a total burning time of more than 50 s during the second exposure of each set of test specimens; no test specimen burns down completely to the retaining clip fastened to the upper end of the test specimen; no test specimen ignites the underlying bandaging material by burning drops or particles; no test specimen smolders for longer than 30 s after removal of the test flame.

Other UL 94 classifications are used for test specimens which are less flame-resistant and self-extinguishing and which release burning drops or particles. These UL 94 classifications are V-1 and V-2. F. stands for "failed" and is the classification used for test specimens which continue burning for more than 30 seconds.

Notched impact strength was determined at room temperature in accordance with DIN 53 453 using test specimens measuring 50×6×4 mm. The test specimens were provided with a 2.7 mm deep V-shaped notch.

For the light test according to ASTM D 4459-85 ("IBM test"), small test plates measuring 60×40×2 mm were injection molded at 250° C. and exposed to light for 300 h in a Xenon Weatherometer Ci 35 (test conditions 0.3 W/m² at 340 nm, blackboard temperature 55° C., relative air humidity 55%, borosilicate internal filter, soda-lime external filter) and then visually evaluated.

Table 1 shows that, for comparable formulations (=same overall composition), the molding compounds according to the invention (1 and 3), which contain the redox-initiated graft polymer B.I, have distinctly higher notched impact strength than the comparison molding compounds (2 and 4) for the same flame resistance.

In the molding compounds according to the invention, the entire graft polymer component, i.e. B) and the part optionally introduced with E) (in the form of the co-precipitate), preferably consists of redox-catalyzed graft polymer (Example 3).

However, the effect according to the invention is also in evidence in cases where only B) is a redox-catalyzed graft polymer while E) (co-precipitate) contains peroxide-catalyzed graft polymer.

Table 2 shows that the molding compound of Example 1 according to the invention has distinctly higher notched impact strength than the comparison material 2 for the same burning behavior.

From the dark-blue colored compositions the material according to the invention (Example 1) shows no discoloration, even after 300 hours' exposure, whereas the comparison material 2 has distinctly discolored after the same period (lightening in color through greying).

TABLE 1

Composition of Properties of the Molding Compositions

| Ex. | Components[1] (parts by weight) | | | | | | | | Notched impact strength (kJ/m²) | UL 94 V 1.6 mm |
|---|---|---|---|---|---|---|---|---|---|---|
| | A.I | A.2 | B.I | B.II | C | D | E.I | E.II | | |
| 1 | 76.5 | | 6 | | 17.5 | 14 | | 3.5 | 14.4 | V 0 |
| 2[2] | 76.5 | | | 6 | 17.5 | 14 | | 3.5 | 7.9 | V 0 |
| 3 | | 68 | 12 | | 20 | 11.5 | 4.2 | | 28.6 | V 0 |
| 4[2] | | 68 | | 12 | 20 | 11.5 | | 4.2 | 14.0 | V 0 |

[1]Examples 1 and 2 additionally contain mold release agent (1 part by weight pentaerythritol tetrastearate) and TiO₂ (3 parts by weight).
Examples 3 and 4 additionally contain mold release agent (1 part by weight pentaerythritol tetrastearate) and carbon black concentrate (0.7 part by weight Black Pearls 900)
[2]Comparison

TABLE 2

Composition of Properties of the Molding Compositions

| Ex. | Components[1] (parts by weight) | | | | | | | Notched impact strength (kJ/m²) | UL 94 V 1.6 mm | IBM test, 300 h |
|---|---|---|---|---|---|---|---|---|---|---|
| | A.2 | B.I | B.II | C | D | E.I | E.II | | | |
| 1 | 68 | 12 | | 20 | 11.5 | 4.2 | | 27.9 | V 0 | no discoloration |
| 2[2] | 68 | | 12 | 20 | 11.5 | | 4.2 | 14.7 | V 0 | greying |

[1]Examples 1 and 2 additionally contain
1.0 part by weight mold release agent (pentaerythritol tetrastearate)
1.6 parts by weight blue pigment mixture (based on Ulma-Blau 690 MP)
[2]Comparison

What is claimed is:
1. A thermoplastic molding compositions comprising
   A) 30 to 97% by weight of A+B+C, of at least one member selected from the group consisting of a thermoplastic aromatic polycarbonate, an aromatic polyester carbonate and an aromatic polyester,
   B) 3 to 30% by weight relative to the total weight of A+B+C, of a graft polymer of
      B.1 40 to 90% by weight relative to the weight of said graft polymer of an at least crosslinked particulate diene rubber having an average particle diameter ($d_{50}$) of from 0.05 μm to 2.0 μm, and
      B/2 60 to 10% by weight relative to the weight of said graft polymer of at least one member selected from the group consisting of styrene, acrylonitrile, and methyl methacrylate prepared by an emulsion graft polymerization using an initiator of an organic hydroperoxide and ascorbic acid to obtain a graft yield of >60% by weight of the monomers B.2,
   C) 0 to 40% by weight relative to the total weight of A+B+C, of a thermoplastic resin which is
      C.1 a thermoplastic copolymer of
         C.1.1 50 to 95% relative to the weight of said copolymer of at least one member selected from the group consisting of styrene, α-methyl styrene, nucleus-substituted styrene and methyl methacrylate and
         C.1.2 50 to 5% relative to the weight of said copolymer of at least one member selected from the group consisting of acrylonitrile, methacrylonitrile, methylmethacrylate, maleic anhydride and N-substituted maleic imide, or
      C.2 a polyalkylene terephthalate,
   D) 1 to 20 parts by weight, based on 100 parts by weight of A+B+C, of a phosphorus compound corresponding to formula (I)

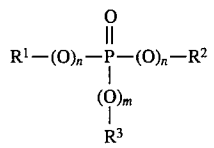

in which
      $R^1$, $R^2$ and $R^3$ independently of one another represent optionally halogenated $C_{1-8}$ alkyl or optionally halogenated and/or optionally alkylated $C_{6-20}$ aryl,
      m is 0 or 1 and
      n is 0 or 1,
   E) 0.05 to 5 parts by weight, based on 100 parts by weight A+B+C, of a fluorinated polyolefin having an average particle diameter of 0.05 to 1000 μm, a density of 1.2 to 2.3 g/cm³ and a fluorine content of 59 to 76% by weight.
2. The thermoplastic molding composition of claim 1, wherein said E) comprise a coagulated mixture of emulsions of said E) having an average particle diameter of 0.05 to 20 μm and a density of 1.2 to 1.9 g/cm³ and an emulsion of said graft polymer B), the ratio by weight of said graft polymer B) to said fluorinated polyolefin E) being from 95:5 to 60:40 and the additional quantity B) being from 0.1 to 4 parts by weight per 100 parts by weight A+B+C.

3. The molding composition of claim 1 wherein said E) is present in the form of a powder having an average particle diameter of 100 to 1000 µm and a density of 2.0 g/cm$^3$ to 2.3 g/cm$^3$.

4. The molding composition of claim 1 further containing an effective quantity of of at least one member selected form the group consisting of stabilizers, pigments, flow aids, fillers, reinforcing materials, mold release agents and antistatic agents.

5. The molding composition of claim 1 containing up to 60% relative to the weight of the composition of glass fibers as reinforced agents.

* * * * *